Oct. 7, 1969   W. O. MUENCHINGER ET AL   3,471,312
EPOXY COATED SUBSTRATE AND METHOD OF MAKING SAME
Filed Oct. 21, 1965

Inventors:
William O. Muenchinger
James W. Hull
By Hofgren, Wegner,
Allen, Stellman & McCord
Atty's United States Patent Office 3,471,312
Patented Oct. 7, 1969

3,471,312
EPOXY COATED SUBSTRATE AND METHOD OF MAKING SAME
William O. Muenchinger, Ann Arbor, Mich., and James W. Hull, Long Grove, Ill., assignors to Morton International, Inc., a corporation of Delaware
Filed Oct. 21, 1965, Ser. No. 499,462
Int. Cl. B41m *1/12;* B44d *1/52;* B05c *3/20*
U.S. Cl. 117—38     13 Claims

ABSTRACT OF THE DISCLOSURE

A coating composition, coated article, and method of coating suitable for printing epoxy coatings on a heat resistant substrate. The melt of a normally solid curable epoxy composition is applied to a heat resistant substrate, e.g., glass or metal which melt solidifies on cooling, e.g., by contact with the cooler glass surface, and is followed by a subsequent coat of a similarly curable epoxy which is liquid at a temperature below the melting temperature of the first coat. Additional coats of progressively still lower melting point epoxies can be applied after solidification of the latest applied coat. All coats are thereafter concurrently cured at an elevated temperature whereupon they form a securely bonded article of infusible, chemically and physically durable coatings on said substrate.

---

Figure 1:
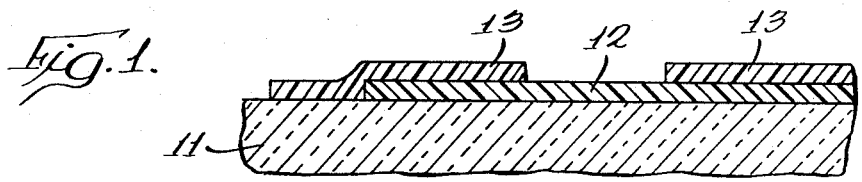

This invention relates to the coating of heat resistant, e.g. vitreous, substrates and especially by use of a pigmented epoxy coating such that the substrate and/or epoxy coating can be coated with still another epoxy coating material, e.g. of a contrasting color. The invention is especially useful where the coatings and overcoatings are concurrently cured to form infusible, durable and abrasion resistant coating. The invention further relates to the preparation of suitable coating compositions and also relates to coated substrates.

Vitreous or ceramic frits are widely used as coatings for various inorganic heat resistant substrates including metal and glass. Vitreous coatings are of particular use for imprinting glass bottles for the purpose of forming decorative designs and/or informative legends thereon. However, it is expensive and time consuming to place a ceramic coating on a glass bottle. The general procedure for coating glass bottles with a ceramic or viterous coating requires the use of a furnace having a hot zone ranging in temperature from about 950° F. to about 1200° F., which is the temperature required to fuse the pigmented vitreous composition generally employed, followed by annealing. The total time required to produce a finished ceramic coated bottle is about one hour and fifteen minutes, which includes about fifteen minutes in the hot zone and about one hour of annealing time. This is a rather expensive power factor and explains why, from an economic standpoint, it is too costly to apply a ceramic coating to a single use "throw away" type bottle, since it is estimated that a ceramic coated bottle must be cleaned and reused about six times to keep the over-all cost competitive with "throw away" bottles.

An alternative to the use of costly ceramic coatings for single use bottles is to employ organic coatings which can be applied without the necessity of employing high temperatures with the attendant prolonged annealing times. Various resinous substances may be employed for this purpose, but cured polyepoxide coatings are most desirable because of their inertness, durability and abrasion resistance. In this respect cured polyepoxide coatings can substantially simulate ceramic coatings in appearance at a fraction of the cost. For example, a polyepoxide composition may be cured to form a finished coating at temperatures less than about 600° F. and at curing times less than about one-half hour.

Thus, glass or other substrates can be coated with a liquid pigmented epoxy or polyepoxide composition and cured to form hard and substantially inert coatings thereon. The liquid epoxy compositions are applied in a conventional manner, i.e., by smearing, painting, stamping, spraying, flexographic application and the like. The use of a liquid composition made the provision of contrasting colored coatings a tedious process since it was necessary that the first or base coating be cured to a solid and inert state before overprinting with a second pigmented coating to avoid smearing, smudging or even removal of the first coating by the second. This two-step procedure requires double curing procedures requiring additional labor and tying up curing furnaces for greater periods of time for each coated article produced.

It is a general object of this invention to provide a new and useful method for coating vitreous and other heat resistant substrates with an epoxy composition.

Another object is to provide a new and useful coating composition for use in the method of the foregoing object.

Still another object is to provide a new and useful epoxy coated and overcoated substrate in which the coating and overcoating can be concurrently cured.

A more particular object of the present invention is to provide a new and useful solid, homogeneous, pigmented polyepoxide composition, i.e. epoxy resin which can be placed on a heat resistant substrate to form a solid, self-supporting curable coating thereon, which upon curing forms an infusible, durable and abrasion resistant coating.

It is another object of the present invention to provide such a solid, homogeneous, pigmented polyepoxide composition as a solid, self-supporting, curable, base coating capable of receiving, prior to curing, a second curable polyepoxide composition without impairing the base coating, both of which coatings upon concurrent curing form an infusible, durable and abrasion resistant surface.

It is a further object of the present invention to provide a new and improved process for applying solid, homogeneous, pigmented polyepoxide compositions to heat resistant substrates to form solid, self-supporting, curable base coatings capable of receiving, prior to curing, a second liquid or solid polyepoxide composition without impairing the base coating, the whole of which, upon concurrent curing of both coatings, forms an infusible, durable and abrasion resistant coating on the substrate.

Figure 2:
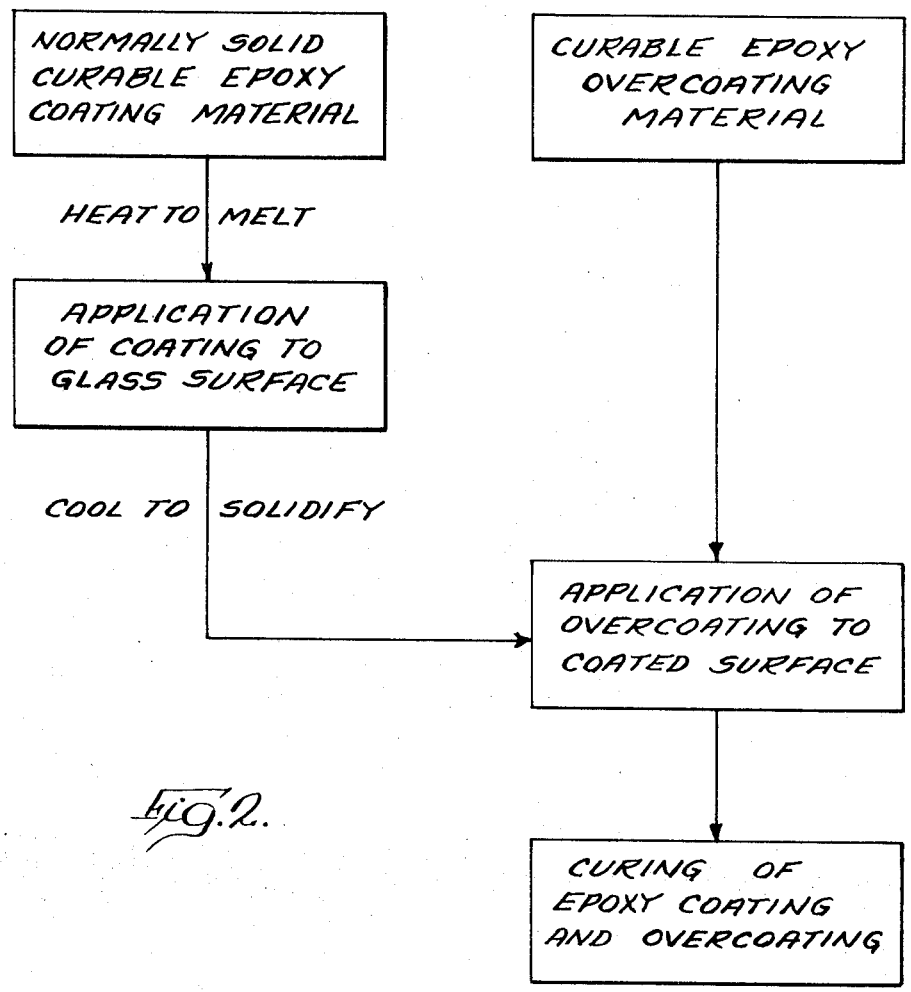

Other objects will be apparent from the following description and from the drawings in which:

FIGURE 1 is a cross-section through an embodiment of coated article according to this invention; and FIGURE 2 is a schematic flow-diagram outlining one form of the method of this invention.

While this invention is susceptible of embodiment in many different forms, there is shown in the drawings and will herein be described in detail embodiments of the invention with the understanding that the present disclosure is to be considered as an exemplification of the principles of the invention and is not intended to limit the invention to the embodiments illustrated.

Referring first to FIGURE 1, the illustrated article includes a glass substrate 11, e.g. a portion of a bottle, having a first or base uncured coating 12 over the surface of the substrate. An uncured second coating or overcoating 13 covers portions of the base coating 12 and the substrate 11. A third or additional uncured overcoatings can be used, applied as discrete layers, over the substrate and/or portions of previously applied layers, including overcoating 13. Each of the coating includes an uncured epoxy resin and the entire assembly can be cured at normal epoxy curing temperatures to provide a cured article having cured coatings corresponding to the uncured coatings.

The article of manufacture need only comprise heat resistant substrate, usually inorganic, such as glass, with an epoxy coating applied thereto in accordance herewith. This first coating is referred to herein as the base coating, and subsequent coatings can be applied thereover if desired prior to curing the base coating. If no subsequent coatings are needed or desired, the base coating can be cured alone. The heat resistant surface has sufficient heat The epoxy resins, i.e. polyepoxides, are commercially available in normally liquid and solid forms having a variety of melting points so that different resins or resin mixtures can be selected for use in the base coating and in each over-coating. The epoxy resin may be, for example, a polymeric polyether of a dihydric phenol, or a glycidyl ether of a polyhydroxy phenol, such as the diglycidyl ether of bisphenol A which is formed by the reaction of a slight molar excess of epichlorohydrin with bisphenol A. The diglycidyl ether of bisphenol A can be identified by the following structural formula:

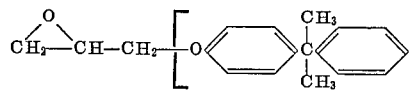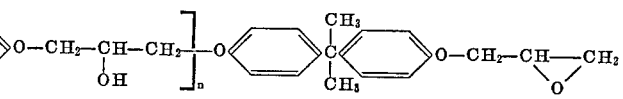

resistance to survive the cure temperature and time. Where glass surfaces are referred to hereinafter, it is intended that any such heat resistant surface can be substituted.

The uncured base coating, including the uncured epoxy resin of the base coating, has a melting point or temperature below the cure temperature of the epoxy resin. Preferably, the base coating and epoxy resin contained therein are normally solid, i.e. at room temperature. Where a first overcoating is applied directly to the base coating, the uncured overcoating, including the uncured epoxy resin of the overcoating has a melting point below its cure temperature and significantly below the melting point of the base coating so that the base coating can be first applied and solidified by reducing its temperature below its melt temperature and the overcoating can be applied as a liquid or melt over the base coating without remelting the base coating.

When subsequent coating is applied over any previous coating, the previous coating is solidified, e.g. by reducing its temperature below melt temperature and the epoxy resin included in such subsequent coating, has a melt temperature below its cure temperature and significantly below the melt temperature of the next previously applied coating with which it comes into contact as a melt. Thus, previously applied coatings can be solidified before applying the next subsequent coating, and the subsequent coating can be applied at sufficienly low melt temperature so as not to melt or mix or bleed with any solidified coatings already on the substrate. The entire assembly of coatings can be cured in one curing step.

wherein $n$ reperesents the number of repeating units in the resin chain denoting the molecular weight of the resin. The actual number represented by $n$ is not critical, although a variance in $n$ will usually vary the melting point of the resin. The resins for the base coatings and the overcoatings are selected by their melting and solidification temperatures, as has been explained.

Examples of specific available epoxy resins of the above formula, and their melting points are:

Epotuf: °C.
    37–300 _____ 50–60
    37–301 _____ 60–68
    37–302 _____ 75–85
    37–128, liquid at room temp. _____ 76
Genepoxy:
    525 _____ 70–80
    625 _____ 75–85
Araldite:
    6060 _____ 60–75
    6071 _____ 65–75
    7071 _____ 65–75
    7072 _____ 75–85
Dow:
    QX–2633.12 _____ 52–60
    DER660 _____ 65–74
    DER661 _____ 70–80
    QX–2661.7 _____ 70–80

As still another example, the epoxy resin may be an epoxylated novolac resin which can be represented by the following general structure:

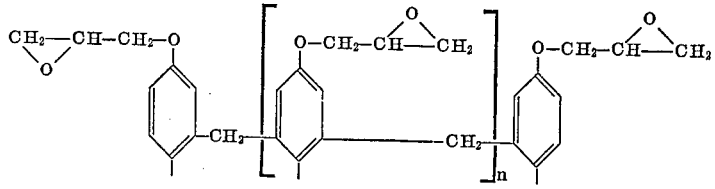

More specifically with respect to the method of producing coated articles, the base coating is applied directly to a previously cleaned glass surface as a melt, e.g. by dipping, brushing, spraying, but more often by print screening. The base coating is solidified and the next coating is applied in a similar manner and also solidified if still other coatings are to be applied.

Advantageously, the present invention permits the formation of excellent definitive coatings on glass surfaces. Various over-coatings of differing colors can be used to reproduce any of a variety of designs on the glass surface, and the plurality of coatings can be cured in one curing operation. The article formed by the method is sufficiently less costly than ceramic coated glass that throw-away bottles can be coated in accordance herewith at an economically feasible cost. The steps of the present method are easily performed using conventional coating application and curing equipment.

wherein $n$ is as described above.

Further, the epoxy resin may be a modified epoxy resin, e.g. esterified with a suitable acid at the hydroxy groups near the ends of the epoxy resin chain.

The epoxy resin may be any resin having a plurality of terminal

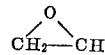

groups. The preferred epoxy resin for use in the base coating has a melting point in the range of 50° C. to 85° C., and the epoxy resins of the subsequent overcoat preferably have melting points within this range or lower, down to and including those epoxy resins which are normally liquid at room temperature. The preferred base coatings and over-coatings contain from about 15 to about 85% by weight of the epoxy resin based on total weight of the coating ingredients. More usually from about 40 to about 60% by weight of epoxy resin will be used. Sufficient epoxy resin should be present to give the desired coating strength.

Each of the base and over-coatings will usually contain coloring matter in the form of a pigment or dye for imparting the proper or desired color to the particular coating, and a curing agent for curing the epoxy resin at the desired cure temperature. The pigment or dye can be inorganic or organic, but should be stable at the cure temperature of the epoxy resin so that the color survives the epoxy cure without decomposition or deterioration. Pigments and dyes can be included in proper amounts for imparting opaqueness and/or color as desired and are usually in amounts of about 10 to about 26% by weight of the total coating composition. Conventional ink pigments and dyes are used, including, among others, molybdenum orange, titanium dioxide, calcium carbonate, siliceous earths, barium sulfate and various other inorganic oxides, carbonates and silicates, as well as organic pigments such as oxynaphthalene red.

The epoxy curing agents are well known in the art and are used herein in their normal concentrations for curing epoxy resins, e.g. 2 to 10%, or more or less. Usually in coating articles on a mass production basis, it is desired that the curing agent be reasonably shelf stable and sufficiently stable at the melt temperature of the coating to provide a good pot life, e.g. 4 to 8 hours. As a guide, shelf life of at least 90 days at room temperature and a pot life of at least 8 hours at 180° F. are acceptable. For this reason, a latent curing agent is especially preferred. The latent curing agent is relatively inactive at the curing temperature during application of the coating, but, at the more elevated epoxy cure temperatures, cures or cross-links the epoxy resin to a hard, infusible state. Particularly preferred as latent curing agents are compounds having a plurality of reactive amine groups, e.g. melamine. Many of these diamine or polyamine type curing agents can be represented by the structural formula:

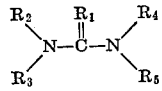

wherein:

$R_1$ represents a member of the group consisting of O, S and NH;

$R_2$ represents a member of the group consisting of H, $C_6H_5$ and —$CH_3$;

$R_3$ represents a member of the group consisting of H and —$CH_3$;

$R_4$ represents a member of the group consisting of H and $C_6H_5$; and $R_5$ represents a member of the group consisting of H, —$C_6H_5$, CN and

Exemplary of some of the useful curing agents are

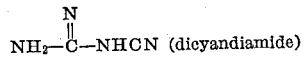

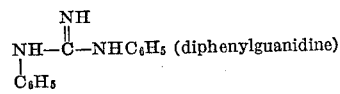

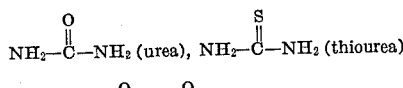

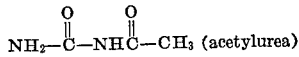

and 2,4,6-triamino-s-triazine, otherwise known as melamine. Melamine, for example, permits a pot life of from 4 to 8 hours at a coating temperature of up to about 220° F. The amount of curing agent used will usually be in the range of 2 to about 10 weight percent of the epoxy resin. It is intended that lesser or greater than stoichiometric amounts can be used, depending on the properties of the finished coating and the processing characteristics desired.

In the preferred practice of the present invention, the coatings are applied by silk screening. For such application, the coating will also usually contain a diluent for the epoxy resin in a proper amount for reducing the viscosity of the resin sufficiently to permit passage of the coating material melt through the screen at the coating temperature. This is particularly true in the base coating where the epoxy resin is preferably normally solid. In a normally solid base coating, the diluent is usually also normally solid to preserve the solid character of the coating composition, although, even in such normally solid coatings, a solid mixture or combination of diluents may be used and one or more of the diluents can be a liquid. In either event, a normally solid base coating composition will contain at least some normally solid diluent. The diluent advantageously preserves the tack-free character of an epoxy resin in the coating composition. A tacky substrate surface impairs printing by the screening process by causing sticky, a condition known as "off-setting" in the trade.

Useful diluents include, for example, the aryl sulfonamides, substituted aryl sulfonamides, aryl sulfonamide formaldehyde condensates, chlorinated polyphenols, diesters of dicarboxylic acids such as diphenyl phthalate. More specific examples of solid diluents of the aryl sulfonamide can be paratoluene-N-cyclohexylsulfonamide, which is a solid sulfonamide commercially available under the tradename "Santicizer 1H"; the substituted aryl sulfonamide can be N-ethyl paratoluene-sulfonamide, which is commercially available under the tradename "Santicizer 3" or can be mixed ortho- and para-toluenesulfonamides which are commercially available under the tradename "Santicizer 9." An aryl sulfonamide formaldehyde is avilable under the tradename "Santolite MHP" and chlorinated biphenyls or triphenyls are available under the tradename "Aroclor." Usually the diluent will be used as about 2 to about 30% by weight, and preferably 5 to 20% by weight, of the total coating composition. The selection and amount of diluent may be determined in part by the epoxy resin used and/or the desired characteristics of the cured coated surface.

Usually each coating composition will also contain a bodying agent for the purpose of providing increased viscosity or thixotropy to the coating material melt so that the coating material will remain in place as a self-supporting body or film after deposition on the glass substrate and during subsequent cure, thereby giving clearer definition to the coating layers in the design. Such viscosity or thixotropy improvers are well known and conventionally used in inks. One such composition which has been found to be particularly useful is a mixture of a particulate inorganic substance having a high surface area and oil absorption value and a liquid polyhydric alcohol as a carrier for the particulate substance. Such particulate inorganic substances include, for example, precipitated calcium carbonate, silica gel, pyrogenic silica, and the like. The liquid polyhydric alcohol may be, for example, glycerol, trimethylol propane, ethylene glycol, propylene glycol, pentanediols, and higher boiling alcohols. The mixture of polyhydric alcohol and particulate inorganic material is used in a proper amount for giving the desired body to the coating composition, as has been indicated. However, it has been found that from about 3 to about 15% by weight of the particulate material and carrier mixture, based on total coating composition, is usually adequate. The mixture usually contains from about 1 to 10 parts dry weight particulate material per part by weight carrier.

It is also intended that other additives, e.g. slip agents, stabilizers, etc. can be incorporated into the coating compositions for imparting other properties as desired or needed. For example, slip agents or anti-tackifiers such as pentaerythritol tetrastearate can be used in minor amounts to impart lubricity to the coating compositions. Pentaerythritol tetrastearate or the like permits slightly lower print temperatures for applying the coating and also reduces surface tack of the applied coating.

For further illustration of the method of this invention, the following specific typical example is given.

TYPICAL EXAMPLE

In the preferred preparation of normally solid or semi-solid coating compositions of this invention, an epoxy resin, diluent and slip agent are mixed, e.g. as granular solids, in the desired proportions and the mixture is placed in a suitable vessel equipped with a high shear stirrer and the resulting mixture is heated to a melt temperature, preferably in the range of about 170° F. to about 220° F. for a normally solid coating composition. For semi-solid or liquid coating compositions, temperatures down to room temperature or below can be used. It has been found that in working with specific compositions used in examples given hereinbelow that heating the mix substantially beyond 220° F. may induce some curing action which should usually be avoided. The high shear stirrer is used to subject the liquid mix to high shear mixing while the curing agent, color matter, bodying agent and any other additives are slowly added to the mix. After all materials have been thoroughly dispersed, mixing is discontinued. In the case of normally solid or semi-solid coatings, the melt can be dumped to a suitable container and permitted to cool until it has solidified. Where the coating is normally solid at room temperature, a solid, hard, glass-like block is formed which can be broken into lumps or crushed to form a pulverulent mass which can be readily handled. This mass may be marketed as an organic ink and may be transported to another location for printing on a substrate.

Where the pulverulent mass has been formed as a solid epoxy ink or coating composition and it is desired to apply the coating to a substrate, the mass is reheated to a melt, e.g. in the range of 170° F. to about 220° F., and the molten mass is screen printed onto the glass substrate using normal screen printing techniques. Semi-solid coatings are also heated as needed to liquify them. Liquid coatings can be used directly as a liquid at room temperatures.

In the screen printing operation, conventional equipment is used. For example, for printing on bottles a stencil of a desired design or legend, made of stainless steel mesh, generally horizontally disposed, and supported by an insulated frame, is connected in an electric circuit with a suitable source of electricity and is heated by resistance where higher than room temperatures are needed. The current is controlled to provide a screen temperature approximating or the same as the temperature of the melt or liquid coating material, e.g. in the range of about 170° F. to about 220° F. for the normally solid material. The melt or liquid is applied to the top side of the heated screen and is forced through the screen and onto the substrate disposed therebelow by a rubber squeegee riding on the frame and rolling across the screen. The glass bottle to be coated or imprinted is rotatably mounted below the screen and is rolled across the bottom of the screen at about the same surface speed as the squeegee. The glass bottle receives the composition as it is forced through the screen. If the coating composition is normally solid, it will usually immediately cool and solidify on the bottle, which is at a temperature sufficiently below the melt temperature to solidify the melt on contact, resulting in a self-supporting, dry, uncured, normally solid epoxy coating on the bottle in the design determined by the stencil.

After coating with a base coat, the bottle may be removed to a second screen printing system similar to the first except that the screen is not heated and a second epoxy coating composition, semi-solid or liquid at room temperature, is applied to the second screen and imprinted directly over the first coating using a stencil which may be of a different or similar design, as desired. Alternatively, the same screen, at lower screening temperature, can be used for applying the over-coating.

The bottle which has been coated with the second epoxy composition is then heated at a cure temperature for the epoxy resins, e.g. between 340° F. and 600° F., for a period of time sufficient to cure the resin, e.g. 5 minutes to 30 minutes. The resulting cured coatings have excellent definition and are hard and infusible, simulating a conventional ceramic coating.

As a variation of the typical process, the initial melt of the base coating material can be used directly for screen printing without first solidifying, crushing and remelting. As another variation, the bottle can be at a higher temperature during coating of the base coating and then cooled to solidify the coating. Numerous other variations will be apparent.

The specific examples given below include specific formulations of base coatings. Typical suitable examples of a semi-liquid over-coating formulation and a liquid over-coating formulation are respectively:

Over-coating Formulation A (semi-liquid)

Ingredient:                      Parts by weight
  Epoxy resin:
    Epotuf 37–300 _____ 50
    Epotuf 37–128 (Epoxide equiv.=200) ____ 50
  Color matter:
    Pimento Red pigment (molybdenum orange) _____ 40
    B-oxynaphtholene red _____ 1
  Bodying agent:
    Purecal T (calcium carbonate)[1] _____ 17
    Glycerin _____ 4
  Diluent:
    Santicizer 3 _____ 20
  Curing agent:
    Dicyandiamide _____ 10
  Miscellaneous:
    Pentaerythritol tetrastearate (slip agent) __ 2
    Triphenyl phosphite (stabilizer to prevent discoloration by Santicizer 3) _____ 0.4

[1] Also functions as an extender pigment or filler.

Over-coating Formulation B (liquid)

This formulation was the same as Over-coating Formulation A except the Epotuf 37–300, Santicizer 3 and triphenyl phosphite were omitted and an additional 50 parts by weight Epotuf 37–128 was included.

EXAMPLE 1

The procedure of the above typical example was follower for mixing and screening the following base coating formulation:

| Component | Percent by Weight |
|---|---|
| Epoxy Resin: | |
|   Glycidyl ether of bisphenol A (Sold under the trade name "Epotuf 37–300") | 52.5 |
| Diluent: | |
|   p-Toluene-N-cyclohexylsulfonamide (Available under the trade name "Santicizer 1H") ... 8.4 | |
|   Mixed ortho and para toluenesulfonamides (Available under the trade name "Santicizer 9") ... 5.3 | 13.7 |
| Curing Agent: Dicyandiamide | 5.3 |
| Bodying Agent: | |
|   Glycerin ... 2.1 | |
|   Calcium carbonate [1] (Available under the trade name "Purecal T") ... 10.4 | 12.5 |
| Pigment: Titanium dioxide | 16.0 |
| | 100.0 |

[1] Also functions as an extender pigment or filler.

while screening the base coating onto a glass bottle, the screen and melt were at a temperature of about 200° F. and the bottle was at room temperature. The solidified base coating was white. The coating applied over the solidified base coating was Overcoating Formulation A. The same screen was used for both coatings and Formulation A was applied from a melt at about 135° F. with screen at about 135° F. and the bottle at room temperature. Cure was at 400° F. for 15 minutes and upon cooling the bottle, the cured red and white design was observed to have excellent definition between the red and white with no bleeding between colors. The coating was extremely hard and durable and closely simulated a ceramic coating in appearance.

EXAMPLES 2–20

In each of these examples, the procedure of Example 1 was repeated except that respective formulations given in the following table for each example were substituted for the Example 1 base coating formulation, Over-coating Formulation B was substituted for Over-coating Formulation A and during screening of the over-coating composition, the composition and screen were at room temperatures.

[Weight, Percent]

| Example | 2 | 3 | 4 | 5 | 6 | 7 | 8 | 9 | 10 | 11 | 12 |
|---|---|---|---|---|---|---|---|---|---|---|---|
| 1. Epoxy Resin: | | | | | | | | | | | |
| Glycidyl Ether of Bisphenol A: | | | | | | | | | | | |
| ("Epotuf 37-300") | 51.0 | | | | | | | | | | |
| ("Epotuf 37-301") | | | | | | | | | 53.0 | 53.0 | 53.0 |
| ("Genepoxy 525") | | 53.3 | 53.0 | 50.4 | 47.8 | 46.7 | 45.6 | 43.7 | | | |
| Epoxylated Novolac: ("Kopox 737") | | | | | | | | | | | |
| 2. Diluent: | | | | | | | | | | | |
| P-Toluene-N-Cyclohexylsulfonamide ("Santicizer 1H") | 17.5 | | 15.8 | 20.1 | 23.8 | 25.6 | 27.3 | 30.4 | 15.9 | 15.9 | 15.9 |
| Mixed Ortho and Para Toluenesulfonamides ("Santicizer 9") | | | | | | | | | | | |
| N-Ethyl-P-Toluenesulfonamide ("Santicizer 3") | | 15.0 | | | | | | | | | |
| Chlorinated Polyphenyl ("Aroclor 5460") | | | | | | | | | | | |
| 3. Curing Agent: | | | | | | | | | | | |
| Dicyandiamide | 5.0 | 5.4 | 5.3 | 5.0 | 4.8 | 4.7 | 4.6 | 4.4 | | | |
| Urea | | | | | | | | | | 4.2 | |
| Thiourea | | | | | | | | | | | 4.2 |
| Diphenyl Guanidine | | | | | | | | | 4.2 | | |
| 4. Bodying Agent: | | | | | | | | | | | |
| Glycerin | 2.0 | 2.1 | 2.1 | 2.0 | 1.9 | 1.9 | 1.8 | 1.7 | 2.1 | 2.1 | 2.1 |
| Calcium Carbonate | 7.8 | 8.1 | 7.9 | 7.5 | 7.2 | 7.5 | 6.9 | 6.6 | 7.9 | 7.9 | 7.9 |
| 5. Pigment: | | | | | | | | | | | |
| Titanium Dioxide | 15.0 | 16.1 | 15.9 | 15.0 | 14.4 | 14.1 | 13.8 | 13.2 | 15.9 | 15.9 | 15.9 |
| Silica | | | | | | | | | | | |
| 6. Pentaerythritol Tetrastearate | 2.0 | | | | | | | | 1.0 | 1.0 | 1.0 |

| Example | 13 | 14 | 15 | 16 | 17 | 18 | 19 | 20 |
|---|---|---|---|---|---|---|---|---|
| 1. Epoxy Resin: | | | | | | | | |
| Glycidyl Ether of Bisphenol A: | | | | | | | | |
| ("Epotuf 37-300") | | | | 57.2 | 23.3 | 55 | | |
| ("Epotuf 37-301") | 53.0 | | | | | | 53.0 | 53.0 | 53.0 |
| Epoxylated Novolac ("Kopox 737") | | 55.5 | | | | | | |
| 2. Diluent: | | | | | | | | |
| P-Toluene-N-Cyclohexylsulfonamide ("Santicizer 1H") | | | | 13.8 | | | | 15.9 |
| Mixed Ortho- and Para-Toluenesulfonamides ("Santicizer 9") | | | | | 2.9 | | | |
| N-Ethyl-P-Toluenesulfonamide ("Santicizer 3") | | | | | 23.3 | 9.9 | | |
| Chlorinated Polyphenyl ("Aroclor 5460") | 15.9 | | | | | | | |
| Diphenyl Phthalate | | | | | | | 15.9 | |
| Aryl Sulfonamide Formaldehyde Condensates ("Santolite MHP") | | | | | | | | 15.9 |
| 3. Curing Agent: | | | | | | | | |
| Dicyandiamide | 4.2 | | 10.2 | | 5.5 | 4.1 | 4.1 | |
| Thiourea | | 2.2 | | | | | | |
| Diphenyl Guanidine | | | | 1.8 | | | | |
| Melamine (2,4,6-Triamino-S-Triazine) | | | | | | | | 4.1 |
| 4. Bodying Agent: | | | | | | | | |
| Glycerin | 2.1 | 2.2 | | 1.0 | | 2.1 | 2.1 | 2.1 |
| Calcium Carbonate | 7.9 | 8.4 | | 3.5 | | 8.0 | 8.0 | 8.0 |
| 5. Pigment: | | | | | | | | |
| Titanium Dioxide | 15.9 | 16.8 | 28.6 | 23.3 | 27.4 | 15.9 | 15.9 | 15.9 |
| Silica | | | 1.1 | 23.3 | 2.2 | | | |
| 6. Pentaerythritol Tetrastearate | 1.0 | 1.1 | | 0.5 | | 1.0 | 1.0 | 1.0 |

Each of the base coatings was white in color and, when overprinted with the Formulation B ink, provided a design on the glass bottle similar in characteristics to that of Example 1.

It is appearent from the foregoing that this invention permits the coating of heat resistant substrates with printed material, decorative designs, etc., by a method which can be quickly and easily carried out by those in the art. The coating procedure requires only one cure step for any plurality of coating layers, e.g., of differing colors, and eliminates the very high temperatures needed for ceramic coatings.

We claim:
1. An article of manufacture comprising a heat resistant substrate and, on said substrate, a plurality of concurrently cured layers of cured epoxy resin, said plurality of layers including a first coating layer of a first epoxy resin on the surface of said substrate and a second subsequently applied coating layer of a second epoxy resin of lower melting point than said first resin in contact with said first resin and defining a predetermined indicia and form and color distinct from said first layer, said coatings being cure bonded together and to said substrate.

2. The article of manufacture of claim 1 wherein said second coating layer consists of a layer overcoating said first coating layer and each of said coating layers includes color matter imparting a color thereto distinct from the color of the other coating layer.

3. The article of manufacture of claim 1 wherein said substrate is glass.

4. An article of manufacture comprising a heat resistant substrate and, on said substrate, a solid coating of cured epoxy resin including a first coating and a second coating cured together with the first coating on the coated substrate, said second coating being in contact with said first coating and defining a predetermined indicia comprising a cured epoxy resin having a melt temperature below the melt temperature of the first mentioned coating and a cure temperature concurrent with a cure temperature of said first coating, said substrate having sufficient resistance for withstanding the concurrent curing temperature of said coatings.

5. A method of providing a cured epoxy multi-layer coating on the surface of a heat resistant substrate, which method comprises applying to the surface a first normally solid curable epoxy resin as a liquid, decreasing the temperature of the applied coating to solidify the coating on said surface, applying to the resulting coated substrate a second curable epoxy resin as a liquid in contact with the solidified first coating, said second epoxy resin having a melt temperature below the melt temperature of said first epoxy resin, and concurrently curing said two resins together on said surface by heating until both coatings are cured.

6. The method of claim 5 wherein each of said epoxy resins includes color matter of a different color and wherein the second applying step comprises applying the second epoxy resin as a predetermined indicia to a limited area of the solidified first coating.

7. The method of claim 5 wherein the cure temperature of said epoxy resins is in the range of 340 to 600° F. and the melt temperature of said first epoxy resin is in the range of 50 to 85° C.

8. The method of claim 5 wherein said first epoxy resin is a normally solid epoxy resin at room temperature and said second epoxy resin is normally liquid at room temperature and wherein said second coating step is carried out at room temperature.

9. The method of claim 5 wherein each of said epoxy resins contains a curing agent selected from the class consisting of melamine and amines having the formula:

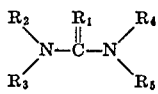

wherein:

$R_1$ represents a member of the group consisting of O, S and NH;

$R_2$ represents a member of the group consisting of H, $C_6H_5$ and —$CH_3$;

$R_3$ represents a member of the group consisting of H and —$CH_3$;

$R_4$ represents a member of the group consisting of H, $C_6H_5$; and $R_5$ represents a member of the group consisting of H, —$C_6H_5$, CN, and

10. The method of claim 5 wherein each of said applying steps comprises print screening the epoxy resin with said epoxy resin in liquid state.

11. A method of providing a cured epoxy, multi-colored design on a glass substrate, which method comprises melting and mixing a normally solid epoxy resin with a normally solid inert diluent and a first color pigment, said resin having a melt temperature below its cure temperature, solidifying the melt and crushing the solidified melt, remelting the crushed material, coating the glass surface with the remelt, solidifying the resulting coating on said glass surface as an uncured coating, applying a second epoxy resin as a liquid containing a second pigment of a color differing from said first pigment in contact with the solidified remelt, said second epoxy resin having a melt temperature below the melt temperature of said first epoxy resin and having a cure temperature at the cure temperature of said first epoxy resin, said applying step being at a temperature between the melt temperatures of said two resins, and concurrently curing the two coatings.

12. A method of providing a cured epoxy, multi-colored design on a glass substrate, which method comprises melting a normally solid epoxy resin containing a first color pigment, said resin having a melt temperature below its cure temperature, coating the glass surface with said pigment resin, cooling to solidify the resulting coating on said glass surface, providing a second epoxy resin containing a second pigment of a color differing from said first pigment, and having a melt temperature below the melt temperature of said first epoxy resin and a cure temperature at the cure temperature of said first epoxy resin, coating said second epoxy resin in a distinct form over the solidified first epoxy resin at a temperature between the melt temperatures of said two resins, and concurrently curing said two coatings together on said surface substantially in their applied form.

13. A method for preparing a cured epoxy coating on a heat resistant surface to form a durable, infusible and self-supporting coating thereon, which process comprises melting a normally solid uncured polyepoxide resin and a normally solid diluent in a proper amount for reducing the viscosity of the resin sufficiently to permit passage of the coating material melt through the screen at the coating temperature for said polyepoxide resin, and mixing 15 to 85 parts by weight of said resin and 2 to 30 parts by weight of said diluent with
  (A) 3 to 15 parts by weight of a bodying agent comprising
    (1) a finely divided inorganic material and
    (2) a liquid polyhydric alcohol as a carrier for said finely divided material
  (B) 2 to 10 parts by weight of a curing agent for said polyepoxide resin and
  (C) 10 to 25 parts by weight of a pigment, heating the resulting mixture to a temperature in the range of 170° F. to 226° F. to form a melt mass, agitating said mass to form a homogeneous dispersion, passing said dispersion through a printing screen onto said surface to form a self-supporting solid coating on said surface, over-coating the solid coating with pigmented liquid epoxy ink, and heating the coated substrate at a temperature in the range of from about 340° F. to about 600° F. for a period of time from about 5 to about 30 minutes until the coating and ink are cured.

References Cited

UNITED STATES PATENTS

| | | |
|---|---|---|
| 2,674,648 | 4/1954 | Nicodemus. |
| 2,861,011 | 11/1958 | Asbeck et al. _____ 117—72 |
| 2,884,339 | 4/1959 | Dannenberg _____ 117—72 |
| 2,956,848 | 10/1960 | St. Clair. |
| 2,997,776 | 8/1961 | Matter et al. |
| 3,355,312 | 11/1967 | Coney _____ 117—72 X |
| 3,360,391 | 12/1967 | Richtzenhain et al. __ 117—72 X |
| 3,362,843 | 1/1968 | Smith et al. _____ 117—72 |
| 3,386,848 | 6/1968 | Dereich. |

OTHER REFERENCES

Troxell, R. H., Screenable Epoxy-Anhydride System For Printed Circuit Boards. IBM Technical Disclosure Bulletin, vol. 7, No. 9, February 1965, p. 735.

WILLIAM D. MARTIN, Primary Examiner

R. HUSACK, Assistant Examiner

U.S. Cl. X.R.

117—45, 72, 94, 124, 161